Jan. 20, 1925.

H. T. LASLETT 1,523,654

CONTROL FOR ENGINES OR VEHICLES

Filed Aug. 4, 1924

INVENTOR
HARRY T. LASLETT
PER
ATTORNEY

Patented Jan. 20, 1925.

1,523,654

UNITED STATES PATENT OFFICE.

HARRY THOMAS LASLETT, OF MARGATE, ENGLAND, ASSIGNOR TO A. M. A. C. LIMITED, OF BIRMINGHAM, ENGLAND, A BRITISH COMPANY.

CONTROL FOR ENGINES OR VEHICLES.

Application filed August 4, 1924. Serial No. 730,129.

*To all whom it may concern:*

Be it known that I, HARRY THOMAS LASLETT, a subject of the King of England, residing at Margate, in the county of Kent, England, have invented certain new and useful Improvements in Controls for Engines or Vehicles, of which the following is a specification.

This invention relates to control mechanism for an engine or vehicle for fitting on a handlebar or the like, and it has for its object to provide a construction in which the parts will be of a simple form and the whole control will be much shorter than usual, so that it can easily be applied to the existing straight end part of a handlebar.

According to this invention, the control comprises an inner sleeve fixed to the handlebar, a block attached to the transmission element of the control sliding in a longitudinal groove in the inner sleeve, and an angularly movable outer sleeve mounted concentrically with the handlebar which surrounds and encloses the inner sleeve and the block also, and is provided with an inclined groove in operative engagement with the said block.

In this way the inner and the outer sleeves can be made of circular form. All the working parts are enclosed by the outer sleeve, and the rubber grip in turn covers over the whole. This permits the whole control to be much shorter than usual, and thus it is easier to fit to an existing handlebar without the necessity for an exceptionally long straight portion thereof or the fitting of an extension.

The manner of carrying out the invention is illustrated in the accompanying drawings, in which Figure 1 is an outside elevation of one construction.

Figure 4 is a longitudinal section of a slightly modified construction, of which

Figure 1:
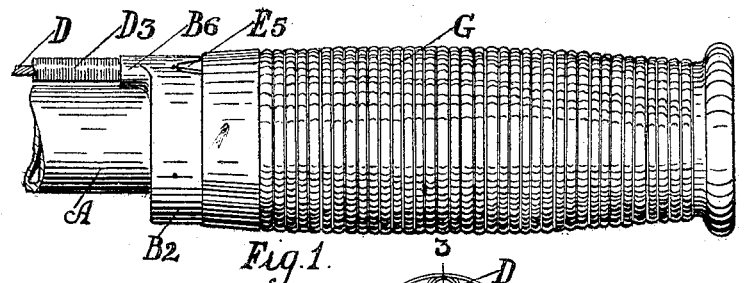
Figure 2:
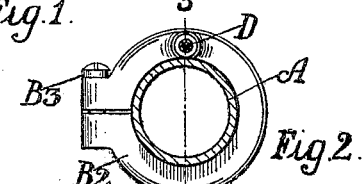
Figure 2 is an end view as seen from the left of Figure 1.

Mounted upon the handlebar A is a fixed sleeve B secured thereon by a split clamp $B^2$, located at one end of it, which is drawn together by the tangent screw $B^3$. In this sleeve is a longitudinal groove $B^4$, one end of which is terminated by the split clamp $B^2$, while the other end is terminated by the metal $B^5$ of the sleeve. Longitudinal slits, not shown in the drawing, may be provided at one or more positions around the sleeve B so as to ensure an effective gripping of the handlebar A, and if desired a pin may extend through a hole in the sleeve and the handlebar to provide a positive lock.

In the groove $B^4$ is slidably mounted a block C, and in this block is a notch for the reception of the terminal block $D^2$ of the transmission cable D. The latter extends through a lug $B^6$ provided on the split clamp $B^2$, and the casing $D^3$ for the cable enters a recess $B^7$ in the lug $B^6$, the bottom of the recess forming the abutment for it.

Surrounding the sleeve B and completely enclosing the part not covered by the split clamp $B^2$ is the angularly movable twist grip sleeve E mounted concentrically with with the handlebar, and at $E^2$ somewhat reduced in diameter to take a seating upon the handlebar A. End movement of this sleeve is prevented by its engagement at one end with the split clamp $B^2$, and at the other end by a disc or stop F secured by a screw $F^2$ at the end of the handlebar.

In the sleeve E is formed an inclined groove $E^3$, preferably helical and this is adapted to engage a projection upon the block C. Preferably this projection is in the form of a hardened steel roller $C^2$ retained in position by the head of a screw $C^3$, the shank of which is secured in the block C. A thin layer of sheet metal $E^4$ may be provided to cover the portion of the sleeve E in which the angular slot $E^3$ is formed, thereby to provide a smooth exterior surface upon which the rubber grip G can be mounted. The latter is thus screened by the sheet metal $E^4$ from injury by the roller $C^3$ on the moving block, and also it cannot interfere with the movements of the block. The end of the rubber grip may have a flange $G^2$ which extends over the disc F.

From the foregoing arrangement it will be seen that when the sleeve E is twisted the engagement of the block C with the angular groove E³ will cause movement of the block along the longitudinal groove B⁴ in the sleeve B, thereby imparting a pull or push to the cable D. A pointer E⁵ may be provided on the end of the sleeve E so that the position of the control may be noted by reference to index marks or the like around the split clamp B².

Figure 3:
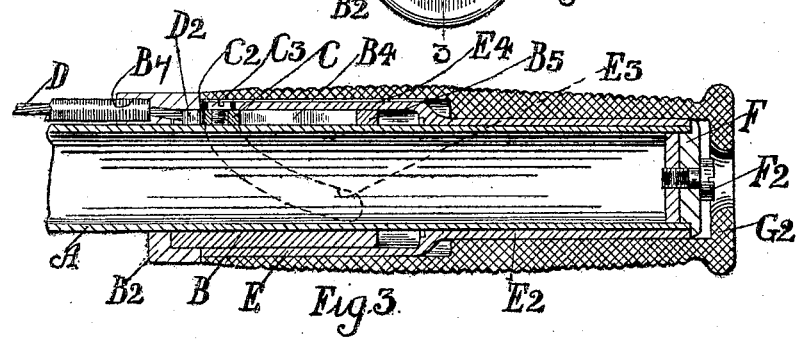
Figure 3 is a longitudinal section on the line 3—3 of Figure 2.
Figure 4:
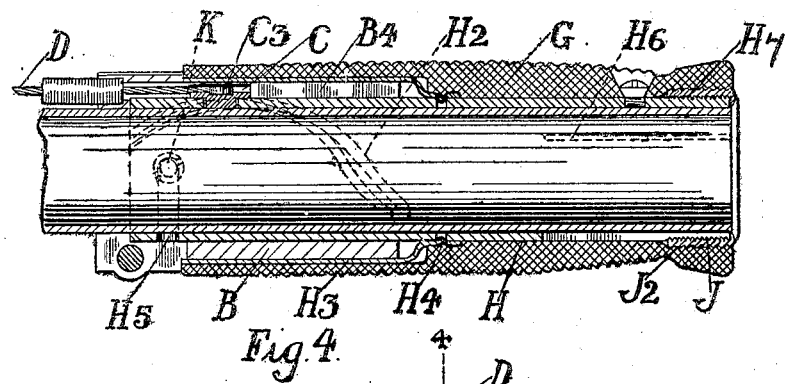
Figure 5:
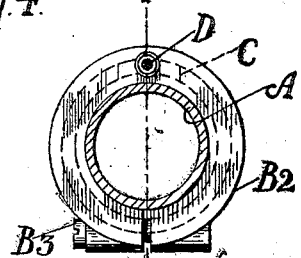
Figure 5 is an end view, the line 4—4 indicating the plane of the section of Figure 4.

By an important feature of the invention, the angular groove E³ may have a varying inclination, so that any desired degree of fine and/or coarse adjustment may be provided for the control, corresponding to uniform angular movements of the twist grip. In the construction shown in Figures 4 and 5, the sleeve E is modified by forming it of two parts. Thus it comprises a relatively thick straight portion H which seats upon the straight portion of the handlebar, and the sleeve B, although still clamped directly to the handlebar A, now seats upon the straight portion H, and in this is formed the angular groove H² which engages the roller C³ on the block C. As before this block slides in the longitudinal groove B⁴ formed in the sleeve B, and to retain the block in place and to surround the sleeve B a sleeve H³ is provided and is attached at H⁴ to the sleeve H. It will be seen, therefore, that the sleeve B is still completely surrounded by the angularly movable twist grip member, but the latter has now a slightly modified construction to provide for the engagement of the block C from the inside instead of the outside of the sleeve B. In other respects it will be seen that the construction is substantially unchanged, except that the sleeve H instead of being retained by a disc such as F in Figure 3, is prevented endwise movement by means of a pin K in the sleeve B which engages a circumferential slot H⁵ in the sleeve H.

If desired the sleeve H may be provided with one or more longitudinal slits H⁶ at its end, the slit part having an external tapering screw thread H⁷. This is engaged by a ring nut J, which, when tightened, causes the split part of the sleeve to grip the handlebar A with a certain amount of friction which can be varied to suit the user. The ring nut has a knurled edge J² which normally is frictionally engaged and held fast by the rubber grip G. To adjust the nut J, the rubber grip is folded back somewhat to free it and give access to it.

What I claim as my invention and desire to secure by Letters Patent of the United States is:—

1. In a control member, the combination of a stationary sleeve adapted to be secured to a fixed part, a longitudinal groove in said stationary sleeve, a movable element adapted to slide in said groove, a transmission member attached to said movable element, an angularly movable and endwise fast operating sleeve surrounding and wholly enclosing said stationary sleeve and said movable element, and an inclined groove in said operating sleeve adapted operatively to engage with said slidable element, substantially as set forth.

2. In a control member, the combination of a stationary sleeve adapted to be secured to the handlebar of a motor vehicle, a longitudinal groove in said stationary sleeve, a movable element adapted to slide in said groove, a cable transmission member attached to said movable element, an angularly movable and endwise fast operating sleeve, an annular space in said operating sleeve adapted to receive said stationary sleeve wholly to enclose it and said movable element, and an inclined groove in said angularly movable sleeve adapted operatively to engage with said slidable element, substantially as set forth.

3. In a control member, the combination of a stationary sleeve adapted to be secured to the handlebar of a vehicle, a longitudinal groove in said stationary sleeve, a movable element adapted to slide in said groove, a cable transmission member attached to said movable element, an angularly movable and endwise fast operating sleeve mounted upon said handlebar and extending between it and said stationary sleeve, an inclined groove in said angularly movable sleeve adapted operatively to engage with said slidable element, and an outer sleeve attached to said angularly movable sleeve which wholly surrounds the aforesaid stationary sleeve secured to the handlebar, substantially as set forth.

4. In a control member, the combination of a stationary sleeve adapted to be secured to a fixed part, a longitudinal groove in said sleeve, a movable element adapted to slide in said groove, a transmission member attached to said movable element, an angularly movable and endwise fast outer sleeve supported by a fixed part and surrounding and wholly enclosing said stationary sleeve and said movable element, an inclined groove in said outer sleeve adapted operatively to engage with said slidable element, and means for varying the frictional engagement of said angularly movable sleeve and said fixed part, substantially as set forth.

5. In a control member, the combination of an inner sleeve adapted to be secured to the handlebar of a motor vehicle, a longitudinal groove in said sleeve, a movable element adapted to slide in said groove, a cable transmission member attached to said movable element, an angularly movable and endwise fast outer sleeve, an annular space in said outer sleeve adapted to receive said inner sleeve wholly to enclose it and said movable element, and a groove in said angularly movable sleeve having a varying inclination to the axis of said sleeve adapted operatively to engage with said slidable element, substantially as set forth.

In testimony whereof I have signed my name to this specification in the presence of two subscribing witnesses.

HARRY THOMAS LASLETT.

Witnesses:
 L. G. HODGSON,
 WM. WALLACE HARMAN.